United States Patent
Krause et al.

(10) Patent No.: US 8,242,229 B2
(45) Date of Patent: Aug. 14, 2012

(54) POLYURETHANES CURED WITH AMINES AND THEIR PREPARATION

(75) Inventors: Jens Krause, Köln (DE); James-Michael Barnes, Breitscheid-Hochscheid (DE); Manfred Schmidt, Dormagen (DE); Wieland Hovestadt, Leichlingen (DE)

(73) Assignee: Bayer MaterialScience AG, Leverkusen (DE)

( * ) Notice: Subject to any disclaimer, the term of this patent is extended or adjusted under 35 U.S.C. 154(b) by 707 days.

(21) Appl. No.: 12/009,873

(22) Filed: Jan. 23, 2008

(65) Prior Publication Data

US 2009/0149621 A1 Jun. 11, 2009

(30) Foreign Application Priority Data

Jan. 29, 2007 (EP) .................................. 07001845

(51) Int. Cl.
C08G 18/70 (2006.01)
(52) U.S. Cl. .............................. 528/67; 528/64; 528/906
(58) Field of Classification Search .................... 528/64, 528/67, 906
See application file for complete search history.

(56) References Cited

U.S. PATENT DOCUMENTS

| | | | | |
|---|---|---|---|---|
| 4,182,825 A | 1/1980 | Jackle | | 528/44 |
| 5,077,371 A | 12/1991 | Singh et al. | | 528/64 |
| 5,962,619 A * | 10/1999 | Seneker et al. | | 528/64 |
| 6,046,297 A | 4/2000 | Rosenberg et al. | | 528/63 |
| 2005/0256288 A1 * | 11/2005 | Zhu et al. | | 528/44 |

FOREIGN PATENT DOCUMENTS

| | | | |
|---|---|---|---|
| CA | 2154243 | * | 1/1996 |
| DE | 10 2004 022 683 A1 | | 11/2005 |
| EP | 0693511 | * | 10/1995 |
| WO | 99/47577 | | 9/1999 |

* cited by examiner

Primary Examiner — Ling Choi
Assistant Examiner — Michael L Leonard
(74) Attorney, Agent, or Firm — N. Denise Brown

(57) ABSTRACT

Polyurethane prepolymers are described which are prepared from 2,4'-diiso-cyanate diphenylmethane (2,4'-MDI), a polyol component and an aliphatic diisocyanate. These prepolymers can be cured with aliphatic, cycloaliphatic and/or aromatic amines to form a cured urethane elastomer. In comparison to cured urethane elastomers based on monomeric 2,4'-MDI, these prepolymers provide elastomers with extended pour life, i.e. they exhibit a slower rate of viscosity buildup after curative and prepolymer are mixed which results in a reduced propensity to crack during the curing process and gives the opportunity to cast larger parts. In comparison to polyurea/urethanes prepared from cured TDI-prepolymers and which optionally include H12-MDI, the prepolymers of the invention have better health and safety aspects.

4 Claims, No Drawings

POLYURETHANES CURED WITH AMINES AND THEIR PREPARATION

CROSS REFERENCE TO RELATED PATENT APPLICATION

The present patent application claims the right of priority under 35 U.S.C. §119 (a)-(d) of German Patent Application No. 07001845.2, filed Jan. 29, 2007.

BACKGROUND OF THE INVENTION

This invention relates to castable polyurethane and/or polyurethane/urea elastomer compositions with improved processing characteristics, including longer pour life, reduced tendency to crack, as well as better health and safety aspects since they are free of toluene diisocyanate. Isocyanate-endcapped prepolymers are employed in the castable elastomers of the invention. Effective processes for the production of such prepolymers and elastomers are disclosed. These prepolymers can be substituted for TDI-prepolymers and for aliphatic isocyanate based prepolymers with similar cure characteristics. The prepolymers of the invention, however, have improved health and safety aspects.

Aromatic polyisocyanates are well known and are widely used in the preparation of polyurethane and polyurethane/urea elastomers. These aromatic diisocyanates generally include compositions such as 2,4-toluene diisocyanate (2,4-TDI), 2,6-toluene diisocyanate (2,6-TDI), 4,4'-methylene-bis-(phenylisocyanate) and 2,4'-methylene-bis-(phenylisocyanate) (4,4'-MDI and 2,4'-MDI) and the like. In the preparation of polyurethane and polyurethane/urea elastomers, the aromatic diisocyanates are reacted with a long chain (high molecular weight) polyol to produce a prepolymer containing free isocyanate groups. This prepolymer may then be chain extended with a short chain (low molecular weight) polyol or aromatic diamine to form a polyurethane or polyurethane/urea elastomer (which is known generically as polyurethane or urethane). A liquid mixture of prepolymer and curative polymerizes, increasing steadily in viscosity until finally a solid elastomer is formed. Among the chain extenders or cross-linking agents (curatives) used, primary and secondary polyalcohols, aromatic diamines, and in particular, 4,4'-methylene-bis(2-chloroaniline), i.e. MBOCA, are most common. The use of MBOCA allows the manufacture of urethane elastomers with good mechanical properties and acceptable processing times.

Although MBOCA is the most widely used chain-extender in the production of castable polyurethanes, it suffers from the disadvantage of decomposition at high temperatures, as well as being quite toxic and Ames positive. These negative features of MBOCA have prompted those in the polyurethane art to investigate alternate materials as chain-extenders. Examples of other amines that have been used include 3,3',5,5'-tetraisopropyl-4,4'-diaminodiphenylmethane and 3,5-dimethyl-3',5'-diisopropyl-4,4'-diaminophenylmethane, 3,5-diethyl-2,4-toluenediamine and/or 3,5-diethyl-2,6-toluenediamine (i.e. DETDA), 4,4'-methylene-bis-(3-chloro-2,6-diethylaniline), 3,5-dimethylthio-2,4-toluenediamine, 3,5-dimethylthio-2,6-toluenediamine, and 3,5-diamino-4-chlorobenzoic acid-isobutylester. While these amines do function as cross-linking agents, the resultant pot life of the polymer mixture is so short that a reasonable processing time for cast elastomers is not possible.

Another curing agent used in the manufacture of polyurethanes is methylene dianiline (MDA). Methylene dianiline is well-known to those skilled in the art as a good curative if there is only aliphatic diisocyanate present. It results in a much shorter pot life than MBOCA. This short pot life is exacerbated by the presence of toluene diisocyanate (TDI). There are also toxicity issues related to the use of MDA.

Another chain-extending agent for polyurethanes is 4,4'-methylene-bis(3-chloro-2,6-diethylaniline) (MCDEA, commercially available as Lonzacure from the Lonza Corporation). This curative material is reportedly lower in toxicity but it reacts with isocyanates much faster than MBOCA does. (See Th. Voelker et al, Journal of Elastomers and Plastics, 20, 1988 and ibid, 30th Annual Polyurethane Technical/Marketing Conference, October, 1986.) Although this curative does react with isocyanate-terminated prepolymers (including TDI-based prepolymers or 2,4'-MDI-based prepolymers) to give elastomers with desirable properties, they have a tendency to crack when undergoing polymerization.

The amount and presence of free, unreacted TDI monomer has other deleterious effects on the processing and manufacture of urethanes. A major problem with mono-nuclear aromatic diisocyanates, such as toluenediisocyanate, is that they are toxic and because of their low molecular weight, they tend to be quite volatile. Therefore, 2,4'-MDI-based prepolymers have much better health and safety aspects. Pure 4,4'-MDI-based prepolymers cured with amines, however, are much to fast.

U.S. Pat. No. 5,077,371 discloses a prepolymer that is low in free TDI. U.S. Pat. No. 4,182,825 also describes polyether based prepolymers made from hydroxy terminated polyethers capped with toluene diisocyanate, in which the amount of unreacted TDI is substantially reduced. These prepolymers can be further reacted with conventional organic diamines or polyol curatives to form polyurethanes. When combining the teachings of this patent with the use of MCDEA as a chain extender, the resulting solid elastomer goes through a gel stage having a low strength which can allow cracking of the polymerization mass to occur. Conventional TDI prepolymers with higher levels of free TDI also yield the same unsatisfactory gel state.

Surprisingly, it has been found that certain prepolymers prepared with both 2,4'-MDI and an aliphatic diisocyanate can be used with chain extenders such as 3,5-diamino-4-chlorobenzoacid isobutylester, to give elastomers with much longer casting time, thus providing more time and/or larger articles and/or a reduced propensity to crack. This phenomena was only known for TDI-based prepolymers prepared with both TDI and an aliphatic diisocyanate (see U.S. Pat. No. 6,046,297). The prepolymers of the present invention also provide extended pour life, and compared to TDI-based prepolymers known in this field, much better health and safety aspects since they are free of toxic TDI. MDI is known to have a much lower vapor pressure than TDI, and thus, is easier and safer to work with. An example of suitable aliphatic diisocyanate for the present invention would be a mixture of the three geometric isomers of 1,1'-methylene-bis-(4-isocyanato-cyclohexane), which are abbreviated collectively as "H12MDI." One such mixture of isomers is available commercially and commonly referred to as dicyclohexyl-methane-4,4'-diisocyanate. These results are surprising.

SUMMARY OF THE INVENTION

In accordance with the present invention, it has been discovered that castable polyurethane elastomers can be formulated with enhanced processing characteristics during the casting operation, including reduced tendency to crack, extended pour life, and which are free of toxic TDI.

The present invention comprises an isocyanate-terminated prepolymer prepared with both 2,4'-MDI and an aliphatic diisocyanate such as an isomeric mixture of 1,1'-methylene-bis-(4-isocyanatocyclohexane), i.e. H12MDI, with the prepolymer being free of TDI monomer but providing the same curing properties as prepolymers based on TDI. Other examples of suitable aliphatic diisocyanate that may be employed include the various pure geometric isomers of H12MDI; isophorone diisocyanate (IPDI); 1,6-hexamethylene diisocyanate (HDI) and 1,4-cyclohexane diisocyanate (CHDI) and mixtures thereof.

In accordance with the invention, these prepolymer can be then cured with an aromatic diamine curative such as, for example, 3,5-diamino-4-chlorobenzoacid isobutylester to yield castable urethane articles with the desirable properties of enhanced processing characteristics.

DETAILED DESCRIPTION OF THE INVENTION

In the practice of this invention, an organic diisocyanate, such as 2,4'-MDI, is reacted with high molecular weight polyesters and/or polyether polyols to produce a prepolymer. Preferably, the organic diisocyanate comprises an isomeric mixture of diphenylmethane diisocyanate in which the quantity of the 2,4'-MDI isomer is present in an amount of greater than 80% by weight, preferably greater than 90% by weight, and most preferably greater than 97% by weight. The advantage here is that no purifying step (e.g. to remove free isocyanate) has to be carried out.

High molecular weight polyols, including specifically polyether polyols and/or polyester polyols which have a number average molecular weight of at least 250, are used to prepare the prepolymer of the instant invention. Molecular weight of the polyols is preferably from about 500 to 4000, with molecular weights of 1000 to 2000 being the most preferred. However, the molecular weight of the high molecular weight polyol may be as high as 10,000. Thus, these polyols may have a molecular weight ranging between any combination of these upper and lower values, inclusive, e.g. from 250 to 10,000, preferably from 500 to 4000 and most preferably from 1000 to 2000.

The preferred polyalkyleneether polyols of the invention may be represented by the general formula:

wherein:
R represents an alkylene radical,
and
n represents an integer large enough such that the resultant polyether polyol has a number average molecular weight of at least 250, preferably at least 500.

These polyalkyleneether polyols are well-known components of polyurethane products and can be prepared by, for example, the polymerization of cyclic ethers (such as alkylene oxides) and glycols, dihydroxyethers, and the like by known methods.

The polyester polyols are typically prepared by the reaction of dibasic acids (usually adipic acid but other components, such as glutaric acid, sebacic acid, or phthalic acid, may also be present) with diols such as ethylene glycol, 1,2-propylene glycol, 1,4-butylene glycol, diethylene glycol, 1,6-hexanediol, and the like where linear polymer segments are required. Units of higher functionality such as glycerol, trimethylolpropane, pentaerythritol, sorbitol, and the like may be employed with either polyester polyols or polyether polyols if chain branching or ultimate cross-linking is sought.

Some polyester polyols employ caprolactone and dimerized unsaturated fatty acids in their manufacture. Another type of polyester polyol of interest is that obtained by the addition polymerization of ϵ-caprolactone in the presence of an initiator. Still other polyols that can be used are those having at least two hydroxyl groups and whose basic backbone is obtained by polymerization or copolymerization of such monomers as butadiene and isoprene monomers.

Preferred polyols of the current invention are polyalkylene ethers. Most preferred polyols of this group of compounds include polytetramethylene ether glycols (PTMEG). Polycarbonate polyols can also be used.

The total polyol blend portion of the instant invention can be a combination of high molecular weight polyol, as previously described, and low molecular weight polyol. An aliphatic glycol is the preferred low molecular weight polyol. Suitable aliphatic polyols are ethylene glycol, diethylene glycol, triethylene glycol, tetraethylene glycol, propylene glycol, dipropylene glycol, tripropylene glycol, neopentyl glycol, 1,3-butanediol, 1,4-butanediol, and the like.

The most preferred low molecular weight polyol is diethylene glycol. In general, the weight of the low molecular weight polyol should be no more than 20% by weight of the combined weight of high molecular weight polyol and low molecular weight polyol. The preferred weight range is 0 to 15% by weight of the combined weight; and more preferred is 0-8% by weight of the combined weight.

The 2,4'-MDI-based prepolymers are prepared by dissolving or melting 2,4'-MDI used with any other conventional diisocyanates that may optionally be used, adding the polyol or polyol blend, and maintaining the temperature from room temperature to temperatures as high as 150° C. for the necessary time period to react all the available hydroxyl groups. Preferred reaction temperatures are from 30° C. to 100° C., inclusive; and more preferred are from 50° C. to 85° C., inclusive.

Alternatively, the polyol can be provided, and the isocyanate is added thereto.

Once the 2,4'-MDI prepolymer is formed, an aliphatic diisocyanate such as, e.g. H12MDI, and/or a prepolymer prepared from an aliphatic diisocyanate, is then added to the formed 2,4'-MDI prepolymer.

If an aliphatic diisocyanate monomer is to be added to the prepolymer, the preferred monomer is H12MDI or another aliphatic diisocyanate monomer of comparatively high molecular weight, low volatility, and low toxicity. If more volatile aliphatic diisocyanates such as, for example 1,4-cyclohexane diisocyanate (CHDI), isophorone diisocyanate (IPDI) and/or hexamethylene diisocyanate (HDI)) are employed, it is preferred that they be employed as the prepolymers to reduce their volatility. More preferably, the prepolymers of such volatile aliphatic diisocyanates as CHDI, HDI and/or IPDI should contain below about 0.4% by weight of free unreacted monomer. If necessary, free monomer can be removed by use of conventional separation techniques such as extraction, distillation, or absorption.

If a prepolymer prepared from H12MDI (or other aliphatic diisocyanate) is to be added to the 2,4'-MDI prepolymer, the H12MDI prepolymer may be prepared in a manner similar to that for the 2,4'-MDI prepolymer. However, because of the slower reactivity with polyols of H12MDI versus 2,4'-MDI, higher reaction temperatures are employed. Preferred temperatures are 70° C. to 140° C.; more preferred are from 80° C. to 130° C. Free H12MDI may optionally be removed from the prepolymer by the traditional separation processes previously mentioned.

In preparing a prepolymer with either aromatic or aliphatic diisocyanates, the stoichiometric ratio of isocyanate groups to hydroxyl groups in the reactants should preferably be from 1.5:1 to 20:1, although somewhat lower and higher ratios are permissible. When the ratio is much lower, the molecular weight of the isocyanate-terminated polyurethane becomes so large that the viscosity of the mass makes mixing of chain extenders into the prepolymer considerably more difficult. A ratio of two (2) isocyanate groups to one (1) hydroxyl group is the theoretical ratio for the end-capping of a difunctional polyalkyleneether or ester polyol with a diisocyanate. An excess ratio approaching the 20:1 ratio will result in high levels of free diisocyanate in the mixture, which must be subsequently removed at greater cost. The preferred range is from 1.7:1 to 4:1 for prepolymers of 2,4'-MDI, and from 2:1 to 12:1 for prepolymers of H12MDI or other aliphatic diisocyanates.

Representative aliphatic diisocyanates include, but are not limited to, the following, as examples: hexamethylene diisocyanate (HDI); 1,3-xylylene diisocyanate (XDI); 1,1,4,4-tetramethylxylylene diisocyanate in its para- or meta-isomer forms (p-TMXDI, m-TMXDI); isophorone diisocyanate (IPDI); 1,4-cyclohexane diisocyanate (CHDI); and the geometric isomers of 1,1'-methylene-bis-4(-isocyanatocyclohexane) (H12MDI). Preferred diisocyanates include H12MDI, CHDI, and IPDI. More preferred diisocyanates include H12MDI in its various isomeric forms, mixed or pure.

It is desired that about 30-95% by weight of the isocyanate content of the final prepolymer be from the aromatic isocyanate monomer or prepolymer of the final composition, such as 2,4'-MDI. About 5-70% by weight of the isocyanate content of the final prepolymer should be from the aliphatic isocyanate monomer or prepolymer, for example, H12MDI. The sum of the isocyanate content from the aromatic isocyanate monomer and of the isocyanate content from the aliphatic isocyanate monomer totals 100% by weight The curative used for the prepolymer can be selected from a wide variety of conventional and well known organic diamine or polyol materials. Preferred materials are the aromatic diamines which are either low melting solids or liquids. Specifically preferred are the diamines, polyols, or blends thereof having a melting point below 120° C. These diamines or polyols are generally the ones presently used in the industry as curatives for polyurethane. The selection of a curative is generally based on reactivity needs, property needs for a specific application, process condition needs, and pot life desired. Known catalysts may be used in conjunction with the curative.

As previously mentioned, the most preferred curative is MBOCA, 3,5-diamino-4-chlorobenzoic acid isobutylester, MCDEA, or mixtures thereof. Other curatives, such as diethyltoluene diamine (DETDA), tertiary butyl toluene diamine (TBTDA), dimethylthio-toluene diamine (i.e. Ethacure™ 300 from Albemarle Corporation), trimethylene glycol di-p-amino-benzoate (i.e. Polacure™ 740 from Air Products and Chemicals Inc.), and 1,2-bis(2-aminophenylthio)ethane (i.e. Cyanacure from American Cyanamid Company) can be used in addition to the aforementioned preferred curatives.

For curing these prepolymers, the number of —$NH_2$ (amine) groups in the aromatic diamine component should be approximately equal to the number of —NCO (isocyanate) groups in the prepolymer. A small variation is permissible but in general from about 80 to 120% of the stoichiometric equivalent should be used, and preferably from about 85 to 100%.

The reactivity of isocyanato groups with amino groups varies according to the structure to which the groups are attached. As is well known, as described in, for example, U.S. Pat. No. 2,620,516, the disclosure of which is hereby incorporated by reference, some amines react very rapidly with some isocyanates while others react more slowly. In the latter case, it is optional to use catalysts to cause the reaction to proceed fast enough to make the product non-sticky within 30-180 seconds. However, more often it is preferable that the prepolymer/curative blend remains flowable (i.e. below 50 poise) for at least 120 seconds and more preferably for at least 180 seconds.

For some of the aromatic diamines, the temperature of the reaction or of the polyurethane reactants will need only be controlled in order to obtain the proper reaction time; thus, for a diamine that ordinarily would be too reactive, a catalyst would be unnecessary; and a lowering of the reaction temperature would suffice. A great variety of catalysts are available commercially for accelerating the reaction of the isocyanato groups with compounds containing active hydrogen atoms (as determined by the well-known Zerewitinoff test). It is well within the skill of one of ordinary skill in this field to select catalysts to fit particular needs and adjust the amounts used to further refine the conditions. Adipic acid, oleic acid and triethylene diamine (commercially available under the trademark Dabco™ from AirProducts and Chemicals, Inc.) are typical of suitable catalysts.

The polyurethanes and the prepolymers used can be additionally stabilized using auxiliary agents such as acid stabilizers, e.g. chloropropionic acid, dialkylphosphates, p-toluene sulfonic acid, or acid chlorides, e.g. benzoic acid chloride, phthalic acid dichloride, and antioxidants, e.g. Ionol® and Stabaxol®, phosphites and further stabilizers generally known in the art. The stabilizers are used in amounts smaller than 0.5 wt. % (based on the total amount of the polyurethane or the prepolymer used).

The resultant urethane products are suitable for industrial applications that require durable physical and mechanical properties in the final elastomers. Industrial rolls such as paper mill rolls, industrial wheels, and industrial tires are some examples of applications that require such properties.

The following examples are meant for illustrative purposes only and are not intended to limit the scope of this invention in any manner whatsoever.

EXAMPLES

The following materials were used in the working examples:

| | |
|---|---|
| Isocyanate 1: | a liquid diphenylmethane diisocyanate containing about 97% by weight of the 2,4'-isomer of MDI |
| Isocyanate 2: | dicyclohexylmethane-4,4'-diisocyanate having an NCO group content of about 32% by weight |
| Polyol 1: | polytetrahydrofuran, a polyether polyol having an OH number of 112 mg KOH/g polyol, which is commercially available as Terathane ® 1000 from Invista |
| Polyol 2: | a polyesterpolyol having an OH-number 56 mg KOH/g polyol, and which is prepared from adipic acid and ethyleneglycol |
| Amine 1: | 3,5-diamino-4-chlorobenzoic acid isobutyl ester, an amine curing agent |

Preparation of Prepolymers:

Isocyanate 1 was stirred at 50° C. under dry nitrogen. Polyol was added, and the mixture was stirred for 3-6 hours at approximately 80° C. The NCO content was measured.

Details concerning the amounts of Isocyanate 1 and Polyols used are set forth in Table 1, as are measured data for the resultant Prepolymers.

TABLE 1

(comparative prepolymers):

| Example | Isocyanate 1 [wt.-%] | Polyol 1 [wt.-%] | Polyol 2 [wt.-%] | Stirring time in hours | NCO [wt.-%] | Viscosity at 70° C. [mPas] |
|---|---|---|---|---|---|---|
| Prepolymer A1 | 29.53% | 70.47% | — | 3 | 3.81% | 2600 |
| Prepolymer A2 | 34.29% | 65.71% | — | 3 | 5.86% | 1140 |
| Prepolymer A3 | 39.06% | 60.94% | — | 3 | 7.79% | 670 |
| Prepolymer A4 | 21.54% | — | 78.46% | 4 | 3.98% | 3200 |

Preparation of Prepolymers (According to the Invention):

The prepolymer A1 or A4 was stirred for 1 hour at 80° C. under dry nitrogen with Isocyanate 2. The respective quantities of components used and measured data of the resultant prepolymers are set forth in Table 2.

TABLE 2

(prepolymers according to the invention):

| Example | Prepolymer [wt.-%] | Isocyanate 2 [wt.-%] | NCO [wt.-%] | Viscosity at 70° C. [mPas] |
|---|---|---|---|---|
| Prepolymer B1 | 92.81% of A1 | 7.19% | 5.79% | 1942 |
| Prepolymer B2 | 85.45% of A1 | 14.55% | 7.86% | 1356 |
| Prepolymer B3 | 78.45% of A1 | 21.44% | 9.82% | 973 |
| Prepolymer B4 | 92.63% of A4 | 7.37% | 5.95% | 2270 |
| Prepolymer B5 | 85.58% of A4 | 14.42% | 7.94% | 1490 |

Preparation of Cast Elastomers Using the Prepolymers:

All cast elastomers were prepared using Amine 1 as the curing agent. The prepolymer was stirred at 90° C. while degassing until bubble free, and Amine 1 at 100° C. was added while stirring was continued for 30 sec. The mixture was poured into an open mold heated to a temperature of 110° C. and cured for 24 hours at 110° C.

The amounts and results are shown in Tables 3 and 4.

TABLE 3

(comparative cast elastomers):

| | | Example | | | |
|---|---|---|---|---|---|
| | | 1* | 2* | 3* | 4* |
| Prepolymer | | A3 | A2 | A1 | A4 |
| Amount of Prepolymer (parts by weight) | | 100 | 100 | 100 | 100 |
| Amount of Amine 1 (parts by weight) | | 20 | 15 | 10 | 10 |
| casting time | [sec] | 150 | 270 | 500 | 210 |
| mechanical properties | | | | | |
| Shore A (DIN 53505) | | 99 | 97 | 91 | 92 |
| Shore D (DIN 53505) | | 54 | 45 | 34 | 35 |
| Stress at 100% Strain (DIN 53504) | [MPa] | 17.37 | 12.37 | 8.13 | 7 |
| Stress at 300% Strain (DIN 53504) | [MPa] | 28.23 | 19.53 | 10.97 | 12 |
| Ultimate Tensile Strength (DIN 53504) | [MPa] | 38.17 | 39.98 | 28.56 | 45 |
| Elongation at Break (DIN 53504) | [%] | 395 | 481 | 603 | 680 |
| Graves (DIN 53515) | [kN/m] | 119 | 89 | 60 | 79 |
| Rebound Resilience (DIN 53512) | [%] | 49 | 46 | 52 | 43 |
| Abrasion (DIN 53516) | [cbmm] | 56 | 49 | 46 | 70 |
| Compression Set 22° C. (DIN 53517) | [%] | 37.8 | 30 | 26.2 | 22 |
| Compression Set 70° C. (DIN 53517) | [%] | 63.4 | 60.9 | 44.3 | 44 |

*comparative examples

TABLE 4

(cast elastomers according to the invention):

| | | Example | | | | |
|---|---|---|---|---|---|---|
| | | 5 | 6 | 7 | 8 | 9 |
| Prepolymer | | B1 | B2 | B3 | B4 | B5 |
| Amount of Prepolymer (parts by weight) | | 100 | 100 | 100 | 100 | 100 |
| Amount of Amine 1 (parts by weight) | | 15 | 20 | 25 | 15 | 20 |
| casting time | [sec] | 420 | 465 | 540 | 240 | 285 |
| mechanical properties | | | | | | |
| Shore A (DIN 53505) | | 96 | 99 | 96 | 98 | 99 |
| Shore D (DIN 53505) | | 43 | 59 | 43 | 48 | 58 |
| Stress at 100% Strain (DIN 53504) | [MPa] | 10.35 | 16.46 | 23.75 | 19.04 | 26.31 |
| Stress at 300% Strain (DIN 53504) | [MPa] | 17.24 | 31.86 | 17.24 | 33.49 | — |
| Ultimate Tensile Strength (DIN 53504) | [MPa] | 30.49 | 32.68 | 32.38 | 34.27 | 33.07 |
| Elongation at Break (DIN 53504) | [%] | 467 | 304 | 213 | 314 | 170 |

TABLE 4-continued (cast elastomers according to the invention):

| | | Example | | | | |
|---|---|---|---|---|---|---|
| | | 5 | 6 | 7 | 8 | 9 |
| Graves (DIN 53515) | [kN/m] | 73 | 86 | 119 | 91 | 94 |
| Rebound Resilience (DIN 53512) | [%] | 43 | 50 | 43 | 50 | 50 |
| Abrasion (DIN 53516) | [cbmm] | 63 | 66 | 63 | 60 | 72 |
| Compression Set 22° C. (DIN 53517) | [%] | 42.8 | 69.2 | 71.9 | 72.0 | 53.9 |
| Compression Set 70° C. (DIN 53517) | [%] | 65.4 | 93.6 | 94.4 | 72.1 | 83.0 |

As can be seen from Tables 3 and 4, the pouring time in Example 1* was only 150 seconds whereas in Example 6, the pouring time could be increased up to 465 seconds. In Example 5, the pouring time was 420 seconds compared to only 270 seconds in Example 2*. A longer pouring time allows larger and more complex parts to be prepared.

In Example 7 the pouring time was 540 seconds despite the fact that the prepolymer has a high NCO content, i.e. 9.82%. With the inventive prepolymers, one can prepare elastomers with a high hardness which simultaneously have a long pouring time.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane elastomer comprising the reaction product of:
   (a) an NCO-terminated prepolymer prepared by reacting:
      (1) diphenylmethane diisocyanate having a 2,4'-MDI isomer content of greater than 80% by weight, with
      (2) a high molecular weight polyol selected from the group consisting of polyalkyleneether polyols having a number average molecular weight of 250 to 10,000, polyester polyols having a number average molecular weight of 250 to 10,000 and mixtures thereof,
      at a temperature of between 30° C. and 150° C. for a time sufficient to form the NCO-terminated prepolymer, with the OH groups of said polyol being reacted with the NCO groups of said diphenylmethane diisocyanate in an stoichiometric ratio of NCO groups to OH groups in the range of 1.5:1 to 20:1;
   (b) an aliphatic diisocyanate selected from the group consisting of the isomers of 1,1'-methylene-bis-(4-isocyanatocyclohexane), 1,4-cyclohexane diisocyanate, isophorone diisocyanate 1,3-xylylene diisocyanate, hexamethylene diisocyanate, the isomers of m-tetramethylxylylene diisocyanate (TMXDI), mixtures thereof and prepolymers thereof; and
   (c) an aliphatic and/or aromatic di- or polyamine;
   wherein the reactants are present in amounts such that the equivalent ratio of NCO groups to the sum of NCO-reactive groups of the resultant elastomer is in the range of from 0.8:1 to 1.2:1.

2. The polyurethane elastomer according to claim 1, wherein (c) said di- or polyamine is selected from the group consisting of 4,4'-methylene-bis-(2-chloroaniline), 3,5-diamino-4-chlorobenzoic acid isobutyl ester and 4,4'-methylene-bis-(3-chloro-2,6-diethylaniline).

3. A process for the production of polyurethane elastomers comprising:
   (A) reacting
      (a1) diphenylmethane diisocyanate having a 2,4'-isomer content of greater than 80% by weight with
      (a2) a high molecular weight polyol selected from the group consisting of polyalkyleneether polyols having a number average molecular weight of 250 to 10,000, polyester polyols having a number average molecular weight of 250 to 10,000 and mixtures thereof,
      at a temperature of between 30° C. and 150° C. for a time sufficient to form an NCO-terminated prepolymer, with the OH groups of said polyol being reacted with the NCO groups of said diphenylmethane diisocyanate in an equivalent ratio of NCO groups to OH groups in the range of 1.5:1 to 20:1;
   (B) adding
      (b) an aliphatic diisocyanate selected from the group consisting of the isomers of 1,1'-methylene-bis-(4-isocyanatocyclohexane), 1,4-cyclohexane diisocyanate, isophorone diisocyanate, 1,3-xylylene diisocyanate, hexamethylene diisocyanate, the isomers of 1,1,4,4-tetramethylxylylene diisocyanate, mixtures thereof and prepolymers thereof,
      to the NCO-terminated prepolymer formed in step (A); and
   (C) reacting the mixture from step (B) with
      (c) an aliphatic and/or aromatic di- or polyamine, in a sufficient amount to effectively cure the polyurethane;
   wherein the reactants are present in amounts such that the equivalent ratio of NCO groups to the sum of NCO-reactive groups of the resultant elastomer is in the range of from 0.8:1 to 1.2:1.

4. The polyurethane elastomer of claim 3, wherein (c) said di- or polyamine is selected from the group consisting of 4,4'-methylene-bis(2-chloroaniline), 3,5-diamino-4-chlorobenzoic acid isobutyl ester and 4,4'-methylene-bis(3-chloro-2,6-diethylaniline).

* * * * *